United States Patent
Schwartz, Jr. et al.

(10) Patent No.: US 6,197,838 B1
(45) Date of Patent: *Mar. 6, 2001

(54) PROCESS FOR SEPARATING POLYESTER FROM OTHER MATERIALS

(75) Inventors: John A. Schwartz, Jr., Spartanburg, SC (US); Richard Perrett King, Charlotte, NC (US)

(73) Assignee: The Coca-Cola Company, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/327,663

(22) Filed: Jun. 8, 1999

Related U.S. Application Data

(63) Continuation of application No. 08/631,710, filed on Apr. 10, 1996.

(51) Int. Cl.[7] .................................................. C08J 11/04
(52) U.S. Cl. ............................. 521/48; 521/405; 521/40
(58) Field of Search ............................... 521/48; 528/489, 528/481; 75/417, 713

(56) References Cited

U.S. PATENT DOCUMENTS

| | | |
|---|---|---|
| 2,927,130 | 3/1960 | Schütt . |
| 3,047,435 | 7/1962 | Wemple . |
| 3,120,561 | 2/1964 | Chambert . |
| 3,215,735 | 11/1965 | Sakuri et al. . |
| 3,257,335 | 6/1966 | Whitfield et al. . |
| 3,400,187 | 9/1968 | Farrow . |
| 3,503,904 | 3/1970 | Dietz et al. . |
| 3,544,622 | 12/1970 | England . |
| 3,579,572 | 5/1971 | Amedjian et al. . |
| 3,594,414 | 7/1971 | Katzschmann . |
| 3,647,422 | 3/1972 | Wainer . |
| 3,652,466 | 3/1972 | Hittel et al. . |
| 3,873,314 | 3/1975 | Woo et al. . |
| 3,873,609 | 3/1975 | Wu et al. . |
| 3,884,850 | 5/1975 | Ostrowski . |
| 3,928,253 | 12/1975 | Thornton et al. . |
| 3,952,053 | 4/1976 | Brown, Jr. et al. . |
| 3,953,502 | 4/1976 | Fassell et al. . |
| 3,956,088 | 5/1976 | Fassell et al. . |
| 4,033,907 | 7/1977 | Wolf . |
| 4,078,143 | 3/1978 | Malik et al. . |
| 4,163,860 | 8/1979 | Delattre et al. . |
| 4,201,871 | 5/1980 | Tanouchi et al. . |
| 4,212,774 | 7/1980 | Idel . |
| 4,250,331 | 2/1981 | Shimsick . |
| 4,324,705 | 4/1982 | Seto et al. . |
| 4,345,098 | 8/1982 | Schep . |
| 4,355,175 | 10/1982 | Pusztaszeri . |
| 4,392,889 | 7/1983 | Grout . |
| 4,578,502 | 3/1986 | Cudmore . |
| 4,578,510 | 3/1986 | Doerr . |
| 4,602,046 | 7/1986 | Buser et al. . |
| 4,605,762 | 8/1986 | Mandoki . |
| 4,612,057 | 9/1986 | Buser et al. . |
| 4,617,111 | 10/1986 | Grimm . |
| 4,620,032 | 10/1986 | Doerr . |
| 4,626,598 | 12/1986 | Packer et al. . |
| 4,629,780 | 12/1986 | Schoenhard . |
| 5,064,466 | 11/1991 | Hilton . |
| 5,095,145 | 3/1992 | Rosen . |
| 5,120,768 | 6/1992 | Sisson . |
| 5,234,110 | 8/1993 | Kobler . |
| 5,248,041 | 9/1993 | Deiringer . |
| 5,254,666 | 10/1993 | Benzaria . |
| 5,286,463 | 2/1994 | Schwartz et al. . |
| 5,366,998 | 11/1994 | Schwartz et al. . |
| 5,395,858 * | 3/1995 | Schwartz, Jr. ......................... 521/48 |
| 5,580,905 * | 12/1996 | Schwartz, Jr. ......................... 521/48 |
| 5,958,987 * | 9/1999 | Schwartz, Jr. et al. ................ 521/48 |

FOREIGN PATENT DOCUMENTS

| | | |
|---|---|---|
| 0497662A1 | 8/1992 | (EP) . |
| 0550979A2 | 7/1993 | (EP) . |
| 610135 | 10/1948 | (GB) . |

* cited by examiner

*Primary Examiner*—Edward J. Cain
*Assistant Examiner*—Katarzyna Wyrozebski
(74) *Attorney, Agent, or Firm*—Dority & Manning, P.A.

(57) ABSTRACT

The present invention is directed to a process for separating polyester, and particularly polyethylene terephthalate, from various contaminants and impurities. In general, the process includes the steps of contacting materials containing polyester with an alkaline composition to form a mixture. The mixture is heated causing some of the impurities to be chemically modified into a more separable form. During heating, a portion of the polyester may also be saponified. After heating, the mixture can be washed with water and the polyester can be easily separated from the remaining impurities. Through the process of the present invention, polyester can be separated and recovered from waste materials containing polyvinyl chloride and aluminum. The process is also effective at removing coatings adhered to the polyester and at removing entrained organic and inorganic compounds contained within the polyester.

13 Claims, No Drawings

PROCESS FOR SEPARATING POLYESTER FROM OTHER MATERIALS

RELATED APPLICATIONS

This application is a continuation of prior application Ser. No. 08/631,710 filed on Apr. 10, 1996.

FIELD OF THE INVENTION

The present invention generally relates to a process for separating polyesters from other materials and more particularly to a process for recovering polyester from waste materials containing various contaminants.

BACKGROUND OF THE INVENTION

A polyester is a polymeric material made from the esterification of polybasic organic acids with polyhydric acids. Perhaps the most commonly made and used polyester is polyethylene terephthalate (PET), which is manufactured by reacting terephthalic acid with ethylene glycol.

Polyesters are currently being used in increasing amounts in various applications. For instance, polyesters are commonly used to make all types of containers such as beverage and food containers, photographic films, X-ray films, magnetic recording tapes, electrical insulation, surgical aids such as synthetic arteries, fabrics and other textile products, and other numerous items.

Because polyesters can be remelted and reformed, many efforts are underway to recycle as much polyester as possible after use. Before polyesters can be recycled, however, it is necessary to separate the pbst-consumer polyesters from other products and materials that may be found mixed with or attached to the polyester. Unfortunately, many problems have been encountered in attempting to separate polyester from other waste materials. In particular, many prior art processes are not capable of efficiently or economically recovering polyester when a significant amount of impurities and contaminants are present. Most prior art processes for separating polyesters from other materials have been limited to floatation separation techniques and mechanical recovery processes.

In floatation separation techniques, polyesters are separated from other materials based on density differences. For instance, materials containing polyester can be combined with water in which polyester is known to sink. The less dense materials which float in water can thus be easily separated from the submerged polyester. This procedure is relatively simple and very effective in separating polyesters from specific low density impurities. Floatation separation techniques, however, cannot be used if the polyester is found in combination with materials that sink in water or that have densities comparable to that of polyester.

For instance, post consumer polyester is typically mixed with polyvinyl chloride (PVC) and aluminum, which are not water buoyant. In fact, PVC has a density that is very similar to the density of PET and is often misidentified as PET. Both aluminum and PVC must be separated from polyester before it can be reused. In particular, if PET and PVC are remelted together, hydrochloric acid gases are produced which destroy the properties of the resulting plastic material.

In the past, in order to separate PET from PVC using a floatation separation technique, others have attempted to modify the surface of the PVC so that the PVC will float in an aerated aqueous medium. For instance, in U.S. Pat. No. 5,234,110 to Kobler, a method for separating a PET/PVC chip admixture is disclosed. The chip admixture is contacted with a surface conditioning agent, such as diisodecyl phthalate, to produce relatively hydrophobic polyvinyl chloride chips which will float when contacted with air bubbles in an aqueous medium.

In U.S. Pat. No. 5,120,768 to Sisson, a process for separating PET from PVC includes treating PET and PVC flakes with at least one inorganic base and at least one nonionic surfactant. The flakes are treated under conditions and for a time sufficient to decrease the contact angle of the PET flakes with water below a value of 25° while maintaining the contact angle of the PVC flakes above a value of about 45°. When the treated flakes are placed in an agitated aqueous mixture, gas bubbles contact the PVC flakes causing the PVC flakes to float.

In the above processes for separating PET from PVC flakes, the surface of the PVC flakes is treated in a manner so that the surface of the PVC is more likely to adhere to air bubbles when placed in an aqueous medium. In order for these processes to be efficient, however, the PVC flakes must have a high surface area to volume ratio. Consequently, the above processes are deficient in separating PVC chips from PET when the PVC chips have a large interior volume.

Besides failing to separate polyesters from heavier-than-water impurities, floatation separation techniques also fail to remove coatings that are commonly adhered to polyester. For example, polyester containers are commonly coated with vapor barrier coatings, saran coatings, and/or inks.

Mechanical recovery processes as used herein are washing processes used to strip specific binder and adhesive layers off polyester films without substantial reaction occurring between the polyester and the wash solution. For example, U.S. Pat. Nos. 5,286,463 and 5,366,998 both to Schwartz. Jr., one of the current inventors, and both of which are incorporated herein in their entireties by reference thereto, disclose a composition and process for removing adhesives, particularly polyvinylidene halide and polyvinyl halide based resins, from polyester films, such as photographic films. In one embodiment, the polyester films are mixed with a reducing sugar and a base to remove the adhesive polymeric resin from the film. An acid is then added to precipitate the resin which can then be separated from the polyester film.

U.S. Pat. No. 4,602,046 to Buser et al. discloses a method for the recovery of polyester from scrap material such as photographic film having a polyester base and at least one layer of macromolecular organic polymer. Specifically, scrap material is cut or chopped into small individual pieces or flakes and treated in a caustic alkaline solution at a solids level of at least 25% by volume and under conditions of high shear. The organic polymer coating material is removed from the polyester flakes. The polyester flakes are then separated from the polymer coating material by filtration or centrifugation, rinsed in water, and dried. The recovered polyester flakes can be used as a feed stock for making films, bottles or other polyester articles.

A method and apparatus for recovering silver and plastic from used film is also disclosed in U.S. Pat. No. 4,392,889 to Grout. In this method, the used film is first passed through a bath preferably comprising a hot caustic solution for precipitating silver layered on the film. The film then passes through a second bath of hot caustic until an adhesive sheet disposed on the film has been dissolved. Typically, the adhesive sheet is made of polyvinylidene chloride which adheres the silver to the film. After a second caustic bath, the film is dried and available for use.

Other processes for recovering polyester from photographic films are disclosed in U.S. Pat. No. 3,928,253 to Thornton et al., U.S. Pat. No. 3,652,466 to Hittel et al., U.S. Pat. No. 3,647,422 to Wainer, and U.S. Pat. No. 3,873,314 to Woo et al.

As shown above, mechanical recovery processes have generally been limited to use with photographic films. In recycling the photographic films, silver is also recovered making the processes economically viable. Mechanical recovery processes, although very successful at removing the emulsion-type coatings found on photographic films, have generally not been successful in removing other types of coatings from polyesters. For instance, most of these processes are not capable of efficiently removing some of the vapor barrier coatings and inks that are applied to polyesters.

Other contaminants that are generally not removable from polyesters using floatation separation techniques and mechanical recovery processes as described above are entrained organic and inorganic compounds. These contaminants include, for instance, gasoline, kerosene, motor oil, toluene, pesticides and other compounds that are absorbed by polyesters when placed in contact therewith. If the entrained organic and inorganic compounds are not substantially removed from the polyester materials during recycling, the recycled polyesters cannot be used as food containers or as beverage containers.

Because of the above noted deficiencies in prior art processes, large amounts of recyclable polyesters are being scrapped and loaded into landfills or are being incinerated. Unfortunately, not only is the polyester not being reused, but the polyester materials are creating a waste management and disposal problem.

Recently, the focus of recovering polyester from the waste stream has changed from mechanical washing processes to chemically converting the polyester into usable chemical components. For instance, in U.S. Pat. No. 5,395,858 and in U.S. patent application Ser. No. 08/400,789 both to Schwartz, Jr., one of the current inventors, and both of which are incorporated herein in their entireties by reference thereto, a process for recycling polyesters in which the polyesters are reduced to their original chemical reactants is disclosed. The process includes the steps of combining the polyester materials with an alkaline composition to form a mixture. The mixture is heated to a temperature sufficient to convert the polyester to an alkaline salt of a polybasic organic acid and a polyol. The temperature is also sufficient to evaporate the polyol as it is formed. During the process, the alkaline composition is added in an amount sufficient to react with all of the polyester present in the mixture.

In the above chemical processes, it is taught to chemically convert and saponify substantially all of the polyester. The process of the present invention, on the other hand, is directed to partial saponification of the polyester in separating the polyester from the impurities. Other various features, aspects and advantages of the present invention which are also absent from the prior art will be made apparent from the following detailed description of the present invention.

SUMMARY OF THE INVENTION

The present invention is directed to further improvements in processes and methods for separating and recovering polyesters from other materials. Through the process of the present invention, polyesters can be separated from many types and varieties of various contaminants and impurities. Accordingly, it is an object of the present invention to provide an improved process for recovering and separating polyesters from other impurities and contaminants.

It is another object of the present invention to provide a process for separating polyesters from polyvinyl chloride.

Still another object of the present invention is to provide a process for removing various coatings adhered to polyesters.

Another object of the present invention is to provide a process for separating polyesters from aluminum.

It is another object of the present invention to provide a process for removing entrained organic and inorganic compounds from polyesters.

Another object of the present invention is to provide a process for recovering "food-grade" polyester from waste materials.

These and other objects of the present invention are achieved by providing a process for separating and recovering polyesters from materials containing contaminants and impurities. Generally, the process of the present invention includes the steps of combining materials containing polyester with an alkaline composition to form a mixture. The alkaline composition is added to the materials in a stoichiometric amount sufficient to react with up to about 50% of the polyester. The mixture is then heated to a temperature sufficient to saponify a portion of the polyester but insufficient to melt the polyester. Once the mixture is heated, the polyester can then be separated from the remainder of the materials by various means. Some of the contaminants and impurities that can be removed by the process include polyvinyl chloride, aluminum, coatings adhered to the polyester, and organic and inorganic compounds entrained within the polyester.

The alkaline composition combined with the materials can be, for instance, sodium hydroxide, calcium hydroxide, magnesium hydroxide, potassium hydroxide, lithium hydroxide, and mixtures thereof. In many applications, the alkaline composition need only be added in a stoichiometric amount sufficient to react with about 10% or less of the polyester. Also, a surfactant can be added with the alkaline composition to facilitate mixing.

After being combined with the alkaline composition, the materials containing the polyester can be heated to a temperature up to the melting point of the polyester and in one embodiment can be from about 212° F. to about 520° F. In some applications, it is desirable to heat the mixture in an oxygen-starved environment, such as in the presence of an inert gas.

In most applications, the polyester being recovered is polyethylene terephthalate. When present in the starting materials, a portion of the polyethylene terephthalate will be saponified and converted into a metal terephthalate and ethylene glycol. The metal terephthalate that is produced can be dissolved in water and the water can be acidified, causing terephthalic acid to precipitate. The terephthalic acid can be filtered and reused as desired.

In one particular embodiment, the present invention is directed to a process for separating polyesters from polyvinyl chloride. The process includes the steps of combining materials containing polyester and polyvinyl chloride with an alkaline composition to form a mixture. The mixture is heated to a temperature sufficient to dechlorinate a least a portion of the polyvinyl chloride thereby converting the polyvinyl chloride into a form separable from the polyester. The mixture, however, is heated to a temperature insufficient to melt the polyester.

In order to separate the dechlorinated polyvinyl chloride from the polyester, in one embodiment the mixture after being heated can be combined with a fluid such as water. When placed in water, the polyester will sink while the dechlorinated polyvinyl chloride will float. Thus, the dechlorinated polyvinyl chloride can be easily separated from the polyester. Gas bubbles, which will adhere to the dechlorinated polyvinyl chloride, can be passed through the water in order to facilitate separation.

In another embodiment of the present invention, a process for separating polyesters from aluminum is provided. This process includes the steps of combining materials containing polyester and aluminum with an alkaline composition to form a mixture. The mixture is heated to a temperature sufficient for the alkaline composition to react with at least a portion of the aluminum without melting the polyester. The heated mixture is then washed with a fluid, such as water, in a manner sufficient to break apart the aluminum into smaller pieces. The larger pieces of polyester can thus be easily separated from the smaller pieces of aluminum.

For instance, in one embodiment the heated mixture can be combined with water and the water can be passed through a screen. The screen can include openings having a size sufficient to collect the polyester but insufficient to collect the smaller pieces of aluminum. To break up the aluminum into smaller pieces prior to being passed through the screen, the heated mixture can be combined with the water under shear conditions.

Another aspect of the present invention is directed to a process for removing coatings from polyesters. The process includes the steps of combining materials containing polyester having coatings adhered thereto with an alkaline composition to form a mixture. The alkaline composition is added in a stoichiometric amount sufficient to react with up to about 50% of the polyester. The mixture is then heated to a temperature sufficient to saponify the outer surface of the polyester, thereby removing the coatings from the polyester. The mixture is heated to a temperature insufficient to melt the polyester. If any smaller-sized impurities are present after the mixture is heated, the mixture can be combined with water and passed through a screen having a size sufficient to collect the polyester but insufficient to collect the impurities.

The process of the present invention is also efficient in removing entrained organic and inorganic compounds from polyesters. In this embodiment, materials containing polyesters entrained with organic and inorganic compounds can be combined with an alkaline composition to form a mixture. The alkaline composition can be added to the materials in a stoichiometric amount sufficient to react with up to about 50%, and more particularly up to about 10% of the polyester. The mixture is heated to a temperature sufficient to saponify the outer surface of the polyester, thereby removing any entrained organic and inorganic compounds present near the surface of the polyester. Any remaining organic and inorganic compounds diffuse out of the polyester and are evaporated while the materials are being heated.

Other objects, features and aspects of the present invention will be discussed in greater detail below.

DETAILED DESCRIPTION OF PREFERRED EMBODIMENTS

The present invention is generally directed to a process for recovering and separating polyesters from various contaminants and impurities. For instance, through the process of the present invention, polyesters can be separated and recovered from various coatings including vapor barrier coatings, inks, and saran coatings. The process also facilitates the separation and recovery of polyester when mixed with polyvinyl chloride, aluminum, other polymers such as polyolefins, glues and adhesives, paper, solvents absorbed into the polyester, and other various impurities. During the process, the polyester is partially saponified but largely remains in polymer form.

As used herein, a polyester is defined as an esterification or reaction product between a polybasic organic acid and a polyol. It is believed that any known polyester or copolyester may be used in the process of the present invention. The process of the present invention is particularly directed to a class of polyesters referred to herein as polyol polyterephthalates, in which terephthalic acid serves as the polybasic organic acid.

As used herein, a polybasic organic acid refers to any organic acid having two or more carboxyl groups (—COOH). Most polyesters are derived from dibasic acids or, in other words, from dicarboxylic acids. Polybasic acids can have a linear or a cyclic conformation. Examples of linear polybasic acids that can be used to make polyesters include the aliphatic dicarboxylic acids, and in particular the aliphatic dicarboxylic acids having up to ten carbon atoms in their chains. These acids include adipic acid, glutaric acid, succinic acid, malonic acid, oxalic acid, pimelic acid, suberic acid, azelaic acid, sebacic acid, maleic acid, and fumaric acid.

Cyclic polybasic organic acids, on the other hand, include the carbocyclic dicarboxylic acids. These acids are known as phthalic acid, isophthalic acid, and terephthalic acid. In particular, terephthalic acid is used to make polyethylene terephthalate which is perhaps the most commercially available polyester.

As described above, a polybasic organic acid is combined with a polyol to produce a polyester. Polyols are compounds that contain at least two hydroxyl groups. Many polyesters are synthesized using a polyol which contains two hydroxyl groups, which are referred to as diols. Diols are normally prepared from an alkene by the net addition of two hydroxy groups to the double carbon bond in a method known as hydroxylation. Polyols are commonly referred to as glycols and polyhydric alcohols. Examples of polyols used to make polyesters include ethylene glycol, propylene glycol, butylene glycol, and cyclohexane dimethanol.

For exemplary purposes, the following table contains a nonexhaustive list of commercially available polyesters that may be recovered and recycled according to the present invention. For each polyester, the corresponding polybasic organic acid and polyol are provided.

| POLYESTER | POLYBASIC ORGANIC ACID | DIOL |
| --- | --- | --- |
| Polyethylene Terephthalate | Terephthalic Acid | Ethylene Glycol |
| Polybutylene Terephthalate | Terephthalic Acid | Butylene Glycol |
| PETG Copolyester | Terephthalic Acid | Cyclohexane-dimethanol and Ethylene Glycol |
| PBTG Copolyester | Terephthalic Acid | Cyclohexane-dimethanol and Butylene Glycol |
| Polycyclohexane-dimethanol Terephthalate | Terephthalic Acid | Cyclohexane-dimethanol |

In general, the process of the present invention includes first combining materials containing polyester with a selected amount of an alkaline compound to form a mixture. The mixture is heated causing a portion of the polyester to saponify or, in other words, to hydrolyze. The combination of adding an alkaline compound to the materials and heating also causes some contaminants and impurities to degrade or otherwise to be chemically converted into a form that is easily separable from the polyester. During saponification, various coatings that may be adhered to the polyester are removed and separated from the polyester.

The process of the present invention can run continuously or can be set up as a batch system. Practically any material containing a polyester can be processed. Preferably, the polyester materials are recovered from the solid waste stream, thus alleviating many environmental concerns and disposal problems. The present invention is particularly directed to recycling food containers and beverage containers made from PET. Through the process of the present invention, polyesters can be separated, recovered and reused from post consumer waste, even when the polyesters are found mixed with polyvinyl chloride or aluminum, adhered to various coatings, or entrained with various organic and inorganic compounds. Such materials are currently being disposed of in landfills or are being incinerated after use due to a lack of an economical process that will recover the polyester.

Prior to being contacted with the alkaline composition, the materials containing the polyester can be, if desired, chopped or ground into a particular size. Sizing of the materials is done solely for the purpose of facilitating handling. Generally speaking, the larger the size of the materials and the less surface area to volume ratio, the less saponification of the polyester will occur later in the process. Consequently, smaller dimensions should be avoided and the size of the materials should be left as large as practicable. However, it should be understood that all different sizes and shapes of material may be used within the process of the present invention and no one size or shape is required.

Also prior to being combined with the alkaline composition, the materials containing the polyester can be immersed in water or some other fluid in order to separate the less dense or lighter materials from the heavier materials containing the polyester. More particularly, it is known that polyester sinks in water while other polymers, such as polyolefins, and paper products are water buoyant. Thus, the lighter materials can be easily separated from the heavier materials when contacted with a fluid. Subjecting the materials to a sink/float separation step prior to contacting the materials with the alkaline composition not only reduces the quantity of materials being processed but also cleans the materials prior to further processing.

After being sized and subjected to a sink/float separation if desired, the polyester containing materials are combined and mixed with an alkaline composition to form a mixture. For proper mixing, the materials can be fed to a mixing tank such as a ribbon blender or the like. Preferably, an alkaline solution is combined with the materials to form a slurry. A caustic powder or molten caustic, however, can also be blended with the materials. If a powder is used, it may be necessary to preheat the mixture.

The alkaline compound selected for mixing with the materials is preferably sodium hydroxide, known commonly as caustic soda. Other metal hydroxides and alkalines however, can be used. Such compounds include calcium hydroxide, magnesium hydroxide, potassium hydroxide, lithium hydroxide or mixtures thereof. When used in solution, the metal hydroxide can be combined with water prior to mixing with the materials containing the polyester. For instance, in one embodiment, the metal hydroxide can be mixed with water in about a 1 to 1 ratio.

The amount of the alkaline composition added to the materials containing the polyester will depend upon the type and amount of impurities and contaminants present within the materials. Generally, the alkaline composition should be added only in an amount sufficient to separate the impurities from the polyester, so as to minimize the saponification of the polyester. In most applications, the alkaline composition is added to the materials in a stoichiometric amount sufficient to react with up to about 50% of the polyester. Preferably, the alkaline composition is added in an amount sufficient to react with less than 10% of the polyester and most preferably around 3% of the polyester.

Optionally, a surfactant or wetting agent may be added to the materials and the alkaline composition when forming the mixture. Addition of a surfactant facilitates the mixing of the alkaline composition with the materials, reducing the amount of the alkaline composition that needs to be added. The surfactant should be alkaline stable and can be nonionic to anionic in character. An example of a suitable surfactant is ETHAL TDA-3, a nonionic surfactant marketed by Ethox, Inc. of Greenville, S.C.

After thorough and complete mixing to ensure substantial uniformity, the mixture is heated, and preferably heated indirectly such that it does not contact an open flame. Heating the mixture causes the alkaline composition to react with the polyester and with some of the impurities contained within the materials, allowing the impurities to be easily separated from the polyester.

The actual temperature to which the mixture is heated depends upon a number of factors. In general, the mixture should be heated to as high as possible without melting the polyester. For instance, PET has a melting point typically between 480° F. to about 520° F. Consequently, when substantial amounts of PET are contained within the materials, the mixture should be heated to a temperature below about 520° F. In most applications, the temperature can be within a range of from about 212° F. to about 520° F.

Also the mixture is preferably heated in an oxygen-starved environment. As used herein, oxygen starved refers to an environment in which oxygen is present below about 19% by volume. Maintaining lower oxygen levels during the heating phase prevents the polyester from being degraded and also prevents against uncontrolled combustion. In one embodiment, the mixture can be heated in an inert atmosphere, such as in the presence of a nitrogen blanket. If desired, the mixture can also be heated at reduced pressures, which correspond to lower oxygen levels.

As described above, the process of the present invention is particularly directed to separating polyester from polyvinyl chloride, aluminum, coatings adhered to the polyester, and entrained organic and inorganic compounds. The particular steps involved in separating each of the above impurities according to the process of the present invention will now be discussed.

When polyvinyl chloride is present within the materials, during the process of the present invention the polyvinyl chloride is converted into a form that floats in water and is heat resistant. It is believed that when the polyvinyl chloride is mixed with the alkaline composition and heated, the alkaline composition causes the polyvinyl chloride to dechlorinate, resulting in a darker colored material that is water buoyant and has a higher melting point. Consequently, when polyvinyl chloride is present in the materials, enough alkaline composition should be added sufficient to substantially dechlorinate the polyvinyl chloride or, in other words, to convert the polyvinyl chloride into a form separable from the polyester. In fact, if not contacted with an alkaline composition during the process of the present invention, polyvinyl chloride will melt when heated to the above-discussed temperatures.

In one embodiment, after the materials containing the polyvinyl chloride and polyester are mixed with an alkaline composition and heated, in order to separate the polyvinyl chloride from the polyester, the materials can be washed with water. The dechlorinated polyvinyl chloride will float and can be easily separated from the submerged polyester. Also, it has been found that treating polyvinyl chloride with an alkaline composition in the above described manner causes entrained air and other gas bubbles to have a higher tendency to adhere to the surface of the polyvinyl chloride, making the polyvinyl chloride even more buoyant. Consequently, when the polyvinyl chloride is being separated from the polyester in a liquid, gas bubbles, such as air, may be added to the liquid to increase separation efficiency. Of course, other separation techniques based on the differences in density between the polyester and the dechlorinated polyvinyl chloride may also be incorporated into the process.

Besides decreasing its density, the process of the present invention also darkens the color of the polyvinyl chloride and increases its melting point. Consequently, in another embodiment, the dechlorinated polyvinyl chloride can be separated from the polyester by visual inspection. Further, in another alternative embodiment, a mixture containing polyester and the dechlorinated polyvinyl chloride can be heated in order to melt the polyester. The heated mixture can then be fed to an extruder. Since the dechlorinated polyvinyl chloride has a much higher melting point than the polyester, the dechlorinated polyvinyl chloride can be captured on a screen prior to entering the extruder. In this embodiment, the polyvinyl chloride should be completely dechlorinated to prevent any chlorine from being given off when the polyester is melted.

Besides polyvinyl chloride, polyester collected from the solid waste stream is also typically mixed with pieces of aluminum. The aluminum can originate, for instance, from bottle caps associated with polyester containers. Aluminum, similar to polyvinyl chloride, cannot easily be separated from polyester using a sink/float separation technique.

When contacted with an alkaline composition and heated, aluminum is converted to an alkali aluminum salt, which is typically water soluble. Thus, in one embodiment, an amount of alkaline composition can be added to materials containing polyester and aluminum sufficient to completely convert the aluminum to an aluminum salt. A fluid, such as water, can then be added to the heated mixture to dissolve the aluminum salt and separate it from the polyester.

According to the present invention, however, it has been found that in order to separate the aluminum from the polyester, it is not necessary to completely convert the aluminum into an aluminum salt. Instead, it has been found that reacting a portion of the aluminum with the alkaline composition causes all of the aluminum pieces to become brittle. After being heated, the materials containing the polyester and the aluminum can then be washed with a fluid such a water, preferably under shear conditions, causing the aluminum to be broken into small pieces. The small pieces can be separated from the polyester by passing the water mixture through a screen having a size sufficient to capture the larger polyester chips while allowing the smaller aluminum pieces to pass therethrough.

Consequently, when aluminum is present within the materials containing the polyester, the alkaline composition should be added to the materials in an amount sufficient to react with at least a portion of the aluminum, sufficient to make the aluminum brittle. Of course, the actual amount will depend upon the quantity of aluminum present in the materials and the size of the aluminum pieces.

Besides separating aluminum and PVC from polyester, the process of the present invention is also capable of removing various coatings adhered to polyester. In particular, the process of the present invention is capable of removing vapor barrier coatings and screen printed labels from polyester containers. Vapor barrier coatings are typically applied to beverage containers in order to prevent carbon dioxide escape when containing carbonated beverages. Vapor barrier coatings can be made from saran, polyvinylidene chloride, or an acrylic. Screen printed labels, on the other hand, generally refer to inks that are directly applied to polyester containers, such as beverage containers. For instance, many soft drink containers are typically labeled with an epoxy based ink. In the past, many problems have been encountered in attempting to separate the polyester from these coatings and inks.

In order to remove the above-described coatings from polyester materials according to the present invention, the polyester is combined with the alkaline composition in an amount sufficient to saponify the outside surface of the polyester. Any coatings adhered to the polyester become delaminated when the outside surface of the polyester is saponified. Once separated from the polyester, the coatings are further degraded while the materials are being heated. Specifically, solvents and liquids contained within the coatings are volatilized leaving behind some relatively smaller sized impurities. When the materials are later washed with water, the remaining insoluble impurities can be separated from the larger polyester chips using an appropriately sized screen that allows passage of the impurities while preventing passage of the polyester.

When removing coatings from polyester according to the present invention, the alkaline composition can be added to the materials sufficient to react with up to about 50% of the polyester. For most applications, however, an amount of alkaline composition sufficient to react with up to about 10% and particularly around 3% of the polyester is all that may be needed. Ideally, the amount of alkaline composition added to the materials is minimized in order to recover as much polyester as possible.

Besides various coatings, the process of the present invention is also effective in removing entrained organic and inorganic compounds that may have been absorbed by polyester materials. These compounds can include, for instance, toluene, gasoline, used motor oil, paint, pesticide residues, and other volatile compounds. The compounds can be absorbed by polyester when placed in contact therewith. For instance, polyester food and beverage containers are often misused by consumers after the food or beverage has been consumed. Specifically, the containers are sometimes used to hold various organic and inorganic compounds and solvents. When attempting to recycle these polyesters, it is necessary to remove substantially all of the absorbed organic and inorganic compounds so that the polyester can be once again reused as a beverage container or food container.

According to the present invention, entrained organic and inorganic compounds that may be absorbed into polyester are removed from the polymer during the process. Specifically, the volatile organic and inorganic compounds are substantially removed during the heating step. Less volatile compounds and compounds that slowly diffuse from polyester, on the other hand, are removed by first saponifying the outer surface of the polyester and then evaporating any remaining organic and inorganic compounds. By removing substantially all of any entrained organic and inorganic compounds, "food grade" polyester is recovered which can be used in an unrestricted manner.

In summary, regardless of the impurities present, the process of the present invention includes contacting materials containing polyester with an alkaline composition, heating the materials to a temperature sufficient to partially saponify the polyester and, if necessary, to a temperature sufficient to chemically convert some of the impurities into a more separable form, and then washing the heated materials with a fluid, such as water. During washing, water buoyant contaminants can be separated from the polyester. Also, the water mixture can be passed through a screen in order to separate smaller sized impurities from the polyester.

Besides washing the heated materials with water, in another embodiment, the heated materials can be washed according to a conventional mechanical recovery process as discussed above. For instance, after being heated, the materials containing the polyester can be mixed with a hot aqueous solution containing a surfactant or with a hot aqueous solution containing the alkaline composition and washed. If desired, the mixture can be heated under agitation during the wash cycle. Washing the materials will generally clean the polyester and will dissolve and break apart some of the impurities.

During the process, the portion of the polyester that is saponified is converted into a polyol and an acid salt. For instance, when saponifying PET with sodium hydroxide, the PET is converted into ethylene glycol and disodium terephthalate. The polyol that is formed during the process either remains as a liquid within the mixture or is evaporated if the mixture is heated above the boiling point of the polyol.

The formed acid salt or metal salt, such as disodium terephthalate, dissolves in the water when the heated materials are washed. If desired, the metal salt can be later recovered from the wash water. For instance, if the acid salt is a terephthalate, the wash water can first be filtered in order to remove any undissolved impurities and contaminants. Next, the wash water can be acidified causing terephthalic acid to be precipitated. In order to acidify the solution, a mineral acid such as hydrochloric acid, phosphoric acid or sulfuric acid or an organic acid such as acetic acid or carbonic acid can be added to the solution. Once the terephthalic acid precipitates, the terephthalic acid can be filtered, washed and dried, leaving a relatively pure product.

The equipment and apparatus used during the process of the present invention can vary. Thus far, good results have been obtained when the alkaline mixture containing the polyester is heated in a rotary kiln. The rotary kiln can be heated by an electrical element, by heated oil or by fossil fuel burners. One example of a suitable indirectly heated kiln for use in the process of the present invention is the Rotary Calciner marketed by the Renneburg Division of Heyl & Patterson, Inc. It is believed, however, that a multidisc thermal processor or an oven will work equally as well. Of course, many other similar devices are available which may be used in the process of the present invention.

The present invention may be better understood by reference to the following examples:

EXAMPLE I

Separation of Polyethylene Terephthalate from Polyvinyl Chloride

The following example demonstrates the recovery and separation of PET from waste materials containing polyvinyl chloride (PVC).

22.3 pounds of chopped post-consumer waste containing PET contaminated with paper, polyolefins, and PVC was subjected to a sink/float separation. The post-consumer waste was immersed in water and materials with a specific gravity less than the specific gravity of water were skimmed off the top of the water and removed. The materials skimmed off the top of the water which primarily included paper and polyolefins weighed 0.51 pounds (2.3% by weight of the total amount of waste).

Since PVC has a specific gravity very similar to the specific gravity of PET and because both materials are heavier than water, the PVC was not separated from the PET.

The mixed PET and PVC (21.79 pounds) were added to a ribbon blender and mixed with 1.36 pounds of 50% caustic soda and water. 60 ml of an alkali stable surfactant was added. The surfactant added was SURMAX CS 727 sold by Chemax, Inc. of Greenville, S.C. The PET, PVC, caustic soda and surfactant were mixed until the polymers were evenly coated with the caustic soda.

From the ribbon blender, the mixture was then fed to an externally heated rotary kiln via a feed screw conveyor. The rotary kiln used was a rotary calciner sold by Heyl & Patterson, Inc., Renneburg Division of Pittsburgh, Pa. The shell temperature of the rotary kiln was maintained at 550° F. with a ⅜ inch per foot slope. The feed screw conveyor rotated at 4 rpm while the kiln rotated at 6 rpm. The temperature at the end of the heated zone of the kiln was 403° F. The yield of solid material collected from the kiln was 19.93 pounds (91.5% by weight of the materials fed to the kiln). The reduction in weight is believed to be attributed to some saponification of the PET and to dechlorination of the PVC. The saponified PET was converted into ethylene glycol and disodium terephthalate.

904.8 grams of the solid material collected from the kiln was added to 4 liters of water in order to dissolve any disodium terephthalate contained within the materials. The resulting mixture was then passed through a screen in order to separate the PET and the dechlorinated PVC from the aqueous solution. The aqueous solution was further filtered to remove any remaining undissolved impurities. An acid stronger than terephthalic acid was added to the aqueous solution causing terephthalic acid to precipitate. The precipitate was removed using a filter and washed. After drying, the terephthalic acid precipitate weighed 5.8 grams.

The PET and dechlorinated PVC separated by the screen, which weighed 859.6 grams, was subjected to a second sink/float separation using water. 0.25 grams of floating contaminant was skimmed off the top of the water. The contaminant included paper and dechlorinated PVC. It was noted that one piece of PVC did not float in the water. This piece of PVC was exposed to indirect heat. The PVC became puffy indicating that dechlorination was occurring. Consequently, it is believed that the piece of PVC that did not float was not substantially dechlorinated while in the rotary kiln. Additional heating in the kiln would have resulted in complete separation. Also, the addition of gas bubbles, such as air bubbles, to the water containing the PET and dechlorinated PVC caused the remaining piece of PVC to float.

PET, which sank in the water, was dried and melted. Based on a visual inspection, the PET appeared suitable for a reextrusion process.

EXAMPLE II

Separation of Polyethylene Terephthalate from Aluminum

The following example demonstrates the recovery and separation of PET from waste materials containing aluminum.

Because the density of PET and aluminum are greater than the density of water, PET cannot be separated from aluminum using a simple sink/float separation. PET can be separated from aluminum, however, according to the process of the present invention.

19.2 pounds of chopped post-consumer PET contaminated with 0.06 pounds of aluminum was added to a ribbon blender and mixed with 1.6 pounds of 50% caustic soda and water and 60 ml of an alkali stable surfactant. The surfactant was SURMAX CS 727 sold by Chemax, Inc. of Greenville, S.C. The solid materials were mixed with the caustic soda and the surfactant until the materials were evenly coated with the caustic soda.

From the ribbon blender, the mixture was fed into the externally heated rotary kiln via a screw conveyor as described in Example I. The shell temperature of the rotary kiln was maintained at 550° F. with a ⅜ inch per foot slope. The feed screw conveyor rotated at 4 rpm while the rotary kiln rotated at 6 rpm. The temperature at the end of the heated zone in the rotary kiln was 423.4° F.

The solid material collected from the kiln was in the form of a slightly tannish colored material. The yield of solid material from the kiln was 18.38 pounds (95.7% by weight of the total materials fed to the kiln). The pieces of aluminum exiting the kiln were observed to be very brittle and broke apart very easily.

A portion of the materials exiting the kiln were washed with an alkaline solution. Specifically, 871.6 grams of the solid material collected from the kiln were added to a 5 liter reaction vessel and mixed with 3,728.4 grams of water along with 3% by volume of a 50% caustic soda solution and 2% by volume of the above alkali stable surfactant. The mixture was heated to just below the reflux temperature. Aggressive shear conditions were maintained in the vessel in order to break the reacted aluminum apart into small pieces.

The mixture was then passed through a screen which collected the PET but allowed the reacted aluminum to pass therethrough. It was believed that some of the PET saponified and that some disodium terephthalate was contained in the aqueous solution and could have been recovered by means described in Example I.

The collected PET from the screen was dried and melted. A visual inspection revealed that the PET was free of aluminum and was suitable for a reextrusion process.

EXAMPLE III

Separation of Polyethylene Terephthalate from a Coating Adhered Thereto

The following example demonstrates the delamination and separation of a silk screen printed label applied directly to PET.

19.2 pounds of chopped PET obtained from beverage containers having a screen printed epoxy ink label applied to the outer surface was added to a ribbon blender and mixed with 1.2 pounds of 50% caustic soda and water and 200 ml of an alkali stable surfactant. The surfactant was SURMAX CS 727 obtained from Chemax, Inc. of Greenville, S.C. The coated PET chips, the caustic soda and the surfactant were mixed until the PET chips were evenly coated.

From the ribbon blender, the mixture was then fed to the externally heated rotary kiln via the screw conveyor as described in Example I. The shell temperature of the rotary kiln was maintained at 550° F. with a ⅜ inch per foot slope. The rotary kiln was rotated at a speed of 6 rpm. The temperature at the end of the heated zone of the kiln was 389° F.

The solid material collected from the kiln was in the form of a tannish colored material. The yield of solid material from the kiln was 18.4 pounds (96% by weight of the total materials added to the kiln). The reduction in weight was believed to be due to partial saponification of the PET and due to degradation of the screen print epoxy label.

835.6 grams of the solid material collected from the kiln was added to 4 liters of water in order to dissolve any disodium terephthalate present. The solid material was mixed with water under high shear conditions providing some abrasive action in order to remove any residual screen print label that might have remained on the PET. The water and PET mixture were passed through a screen which collected the PET chips. After drying, the PET chips weighed 777.26 grams (93% by weight yield).

The aqueous solution that passed through the screen was filtered in order to remove any undissolved impurities. The filtrate solution containing the disodium terephthalate was acidified with a stronger acid than terephthalic acid, causing terephthalic acid to precipitate. The terephthalic acid was separated and dried. The terephthalic acid weighed 6.92 grams.

The solid PET chips were melted. A visual inspection revealed that the PET was free of most of the initial screen print and was suitable for a reextrusion process.

EXAMPLE IV

Separation of Entrained Organic and Inorganic Compounds Contained within Polyethylene Terephthalate The following example demonstrates the removal of entrained organic and inorganic compounds contained within PET.

19.2 pound of chopped PET obtained from beverage containers and contaminated with toluene was added to a ribbon blender and mixed with 0.6 pounds of 50% caustic soda and water and 60 ml of an alkali stable surfactant. The surfactant used was SURMAX CS 727 obtained from Chemax, Inc. of Greenville, S.C. The PET chips, the caustic soda and the surfactant were mixed until the chips were evenly coated.

From the blender, the mixture was fed into the externally heated rotary kiln via the feed screw conveyor as described in Example I. The shell temperature of the rotary kiln was maintained at 550° F. with a ⅜ inch per foot slope. The feed screw conveyor was rotated at a speed of 6 rpm, while the rotary kiln was rotate at a speed of 7 rpm. The temperature at the end of the heated zone of the kiln was 395° F.

The resulting solid material collected from the kiln was in the form of a slightly tannish colored material. The yield of solid material from the kiln was 18.92 pounds (98.5% by weight of the total amount of chips added to the kiln).

859 grams of solid material collected from the kiln were added to 4 liters of water in order to dissolve any disodium terephthalate present. The mixture of water and PET were passed through a screen which collected the PET chips. After drying, the PET chips weighed 806.60 grams.

The aqueous solution was filtered in order to remove any undissolved impurities. The solution was then acidified with a stronger acid than terephthalic acid, causing terephthalic acid to precipitate. The terephthalic acid precipitate was separated, dried and weighed. 36 grams of terephthalic acid was recovered.

The dried PET chips were melted and a visual inspection revealed that the PET was very clean and suitable for a reextrusion process.

The concentration of toluene in the PET chips fed to the ribbon blender was 40,000 ppm, determined by gas chromatography. The concentration of toluene in the PET chips recovered from the rotary kiln, on the other hand, was only 110 ppm as determined by gas chromatography. Thus, the above process reduced toluene contamination in the PET to about 1/400th of the original concentration.

It will be understood that the present invention is not limited to any specific parameters, amounts or process steps described herein, and that any method employing agents equivalent to those described falls within the scope of the present invention. It will be understood that while the form of the invention shown and described herein constitutes preferred embodiments of the invention, it is not intended to illustrate all possible forms of the invention. In addition, it should be understood that aspects of the various embodiments may be interchanged both in whole or in part. The words used are word of description rather than of limitation. Various changes and variations may be made to the present invention without departing from the spirit and scope of the following claims.

What is claimed:

1. A process for removing entrained compounds from polyesters comprising the steps of:

combining materials containing polyester entrained with compounds with an alkaline composition to form a mixture, said alkaline composition being added in a stoichiometric amount sufficient to react with up to 50% of said polyester; and heating said mixture to a temperature sufficient to saponify the outer surface of said polyester and to evaporate any compounds present, said mixture being heated for a time and to a temperature sufficient to produce a dry product.

2. A process as defined in claim 1, wherein said mixture is heated to a temperature from about 220° F. to about 520° F.

3. A process as defined in claim 1, wherein said alkaline composition is added to said materials in a stoichiometric amount sufficient to react with and saponify up to about 10% of said polyester.

4. A process as defined in claim 1, wherein said polyester comprises polyethylene terephthalate.

5. A process as defined in claim 1, wherein said alkaline composition comprises a material selected from the group consisting of sodium hydroxide, calcium hydroxide, magnesium hydroxide, potassium hydroxide, lithium hydroxide, and mixtures thereof.

6. A process as defined in claim 1, wherein at least about 3% of said polyester is saponified.

7. A process as defined in claim 1, wherein said alkaline composition comprises a material selected from the group consisting of sodium hydroxide and potassium hydroxide.

8. A process as defined in claim 1, wherein said mixture is heated in an oxygen starved environment.

9. A process as defined in claim 1, wherein said entrained compounds comprise organic compounds.

10. A process as defined in claim 1, wherein said entrained compounds comprise inorganic compounds.

11. A process as defined in claim 1, wherein said entrained compounds comprise hydrocarbons.

12. A process as defined in claim 1, wherein said mixture is heated to a temperate from about 380° F. to about 480° F.

13. A process as defined in claim 1, wherein said mixture is heated to a temperature from about 400° F. to about 425° F.

* * * * *